US009267442B2

(12) United States Patent
Denholm et al.

(10) Patent No.: US 9,267,442 B2
(45) Date of Patent: Feb. 23, 2016

(54) TURBO-COMPOUND TURBOCHARGED ENGINE AND METHOD OF OPERATING TURBO-COMPOUND TURBOCHARGED ENGINE

(71) Applicant: Cummins Ltd., Huddersfield (GB)

(72) Inventors: Tim Denholm, Huddersfield (GB); Toshihiko Nishiyama, Huddersfield (GB); Owen Alistair Ryder, Huddersfield (GB)

(73) Assignee: Cummins Limited, Huddersfield (GB)

( * ) Notice: Subject to any disclaimer, the term of this patent is extended or adjusted under 35 U.S.C. 154(b) by 302 days.

(21) Appl. No.: 13/787,414

(22) Filed: Mar. 6, 2013

(65) Prior Publication Data

US 2013/0227944 A1   Sep. 5, 2013

(51) Int. Cl.
*F02B 33/44* (2006.01)
*F02G 3/00* (2006.01)
(Continued)

(52) U.S. Cl.
CPC ... *F02C 9/00* (2013.01); *F01N 5/04* (2013.01); *F02B 37/002* (2013.01); *F02B 37/005* (2013.01); *F02B 37/04* (2013.01); *F02B 39/10* (2013.01); *Y02T 10/144* (2013.01); *Y02T 10/16* (2013.01)

(58) Field of Classification Search
CPC ........ F01N 5/04; F02B 37/002; F02B 37/005; F02B 37/04; F02B 39/10; F02C 9/00; F02M 25/0707; Y02T 10/144; Y02T 10/16
USPC ................ 60/614, 624, 611–612, 602, 605.2, 60/607–609, 597; 701/108
See application file for complete search history.

(56) References Cited

U.S. PATENT DOCUMENTS 4,694,654 A    9/1987  Kawamura
4,774,811 A *  10/1988 Kawamura ...................... 60/608
(Continued)

FOREIGN PATENT DOCUMENTS

CH         674549      6/1990
JP        60248964    12/1985
(Continued)

OTHER PUBLICATIONS

Machine Translation of Keiichi (Pub. Number JP 2009-257097 A), published on Nov. 5, 2009.*

(Continued)

*Primary Examiner* — Thai Ba Trieu
(74) *Attorney, Agent, or Firm* — Taft, Stettinius & Hollister LLP

(57) ABSTRACT

A method of operating a generator arrangement includes selecting an operating mode as a function of at least one of: a speed of an engine, a temperature of at least a portion of the engine, a property of an exhaust fluid of the engine, and whether an engine braking command signal is received by the controller; controlling the flow of fluid from a first engine outlet to a first turbine by setting, based on the selected operating mode, an operating condition of a first flow control mechanism, the first turbine being part of a turbocharger having a compressor in fluid flow communication with an engine inlet; and controlling the flow of fluid from a second engine outlet to a second turbine by setting, based on the selected operating mode, an operating condition of a second flow control mechanism, the second turbine being parallel to the first turbine and being part of an electrical generator.

20 Claims, 3 Drawing Sheets

(51) Int. Cl.
    *F02D 23/00*     (2006.01)
    *F02C 9/00*     (2006.01)
    *F01N 5/04*     (2006.01)
    *F02B 37/00*     (2006.01)
    *F02B 37/04*     (2006.01)
    *F02B 39/10*     (2006.01)

(56) References Cited

U.S. PATENT DOCUMENTS

| | | | |
|---|---|---|---|
| 7,047,743 B1* | 5/2006 | Stahlhut et al. | 60/608 |
| 7,383,684 B2* | 6/2008 | Vuk | 60/606 |
| 7,891,185 B2* | 2/2011 | Vuk | 60/608 |
| 7,950,231 B2* | 5/2011 | Vuk | 60/624 |
| 8,065,878 B2* | 11/2011 | Vuk | 60/612 |
| 8,522,756 B2* | 9/2013 | Vuk et al. | 701/108 |
| 8,555,636 B2* | 10/2013 | Schwarzenthal et al. | 60/614 |
| 2007/0220885 A1 | 9/2007 | Turner et al. | |
| 2007/0234721 A1* | 10/2007 | Vuk | 60/608 |
| 2009/0045629 A1* | 2/2009 | Vuk | 60/611 |
| 2009/0107123 A1* | 4/2009 | Vuk | 60/605.2 |
| 2009/0223220 A1 | 9/2009 | Vuk | |
| 2010/0146968 A1 | 6/2010 | Simpson et al. | |
| 2010/0154414 A1* | 6/2010 | Schwarzenthal et al. | 60/605.1 |
| 2011/0094224 A1* | 4/2011 | Sheidler et al. | 60/605.2 |
| 2011/0094485 A1* | 4/2011 | Vuk et al. | 60/605.2 |
| 2011/0094486 A1* | 4/2011 | Vuk | 60/605.2 |
| 2012/0285164 A1* | 11/2012 | Kuhlbach et al. | 60/612 |

FOREIGN PATENT DOCUMENTS

| | | |
|---|---|---|
| JP | 2009257097 | 11/2009 |
| WO | 2010092945 | 8/2010 |

OTHER PUBLICATIONS

United Kingdom Search Report, GB1203594.5, Cummins Ltd., Jun. 18, 2012.

* cited by examiner

TURBO-COMPOUND TURBOCHARGED ENGINE AND METHOD OF OPERATING TURBO-COMPOUND TURBOCHARGED ENGINE

The present invention relates to a generator arrangement and a method of operating a generator arrangement. In particular, the present invention relates to a generator arrangement having a turbocharger and a power turbine and a method of operating such a generator arrangement.

Turbochargers are well known devices for supplying air to an inlet of an internal combustion engine at pressures above atmospheric pressure (boost pressures). A conventional turbocharger essentially comprises an exhaust gas driven turbine wheel mounted on a rotatable shaft within a turbine housing connected downstream of an engine outlet manifold. Rotation of the turbine wheel rotates a compressor wheel mounted on the other end of the shaft within a compressor housing. The compressor wheel delivers compressed air to an engine inlet manifold. The turbocharger shaft is conventionally supported by journal and thrust bearings, including appropriate lubricating systems, located within a central bearing housing connected between the turbine and compressor wheel housings.

The turbine stage of a typical turbocharger comprises: a turbine chamber within which the turbine wheel is mounted; an annular inlet defined between facing radial walls arranged around the turbine chamber; an inlet volute arranged around the annular inlet; and an outlet passageway extending from the turbine chamber. The passageways and chamber communicate such that pressurised exhaust gas admitted to the inlet volute flows through the inlet to the outlet passageway via the turbine and rotates the turbine wheel. It is also known to improve turbine performance by providing vanes, referred to as nozzle vanes, in the inlet so as to deflect gas flowing through the inlet. That is, gas flowing through the annular inlet flows through inlet passages (defined between adjacent vanes) which induce swirl in the gas flow, turning the flow direction towards the direction of rotation of the turbine wheel.

Turbines may be of a fixed or variable geometry type. Variable geometry turbines differ from fixed geometry turbines in that characteristics of the inlet (such as the inlets size) can be varied to optimise gas flow velocities over a range of mass flow rates so that the power output of the turbine can be varied to suit varying engine demands. For instance, when the volume of exhaust gas being delivered to the turbine is relatively low, the velocity of the gas reaching the turbine wheel is maintained at a level which ensures efficient turbine operation by reducing the size of the inlet using a variable geometry mechanism. Turbochargers provided with a variable geometry turbine are referred to as variable geometry turbochargers.

Nozzle vane arrangements in variable geometry turbochargers can take different forms. Two known types of variable geometry turbine are swing vane turbochargers and sliding nozzle turbochargers.

Generally, in swing vane turbochargers the inlet size (or flow size) of a turbocharger turbine is controlled by an array of movable vanes in the turbine inlet. Each vane can pivot about an axis extending across the inlet parallel to the turbocharger shaft and aligned with a point approximately halfway along the vane length. A vane actuating mechanism is provided which is linked to each of the vanes and is displaceable in a manner which causes each of the vanes to move in unison, such a movement enabling the cross sectional area available for the incoming gas and the angle of approach of the gas to the turbine wheel to be controlled.

Generally, in sliding nozzle turbochargers the vanes are fixed to an axially movable wall that slides across the inlet. The axially movable wall moves towards a facing shroud plate in order to close down the inlet and in so doing the vanes pass through apertures in the shroud plate. Alternatively, the nozzle ring is fixed to a wall of the turbine and a shroud plate is moved over the vanes to vary the size of the inlet.

A known type of engine is a hybrid electric powertrain. A hybrid electric vehicle is a vehicle which has a powertrain that includes a hybrid electric powertrain (which may combine a conventional internal combustion engine propulsion system and an electric propulsion system). The presence of the electric propulsion system as part of the powertrain is intended to achieve improved fuel economy or improved performance compared to a conventional vehicle (i.e. a vehicle which has a internal combustion engine propulsion system only).

The internal combustion engine portion of a hybrid electric powertrain usually produces less emissions compared to a standard internal combustion engine which has a comparable power output to the hybrid electric powertrain. This may be because the internal combustion engine portion of a hybrid electric powertrain is generally smaller than a standard internal combustion engine which has a comparable power output to the hybrid electric powertrain.

Some known hybrid electric vehicles use a hybrid electric powertrain in which the internal combustion engine generates electricity by powering an electrical generator to either directly power electric drive motors or to recharge batteries.

A known method by which an internal combustion engine can be used to generate electricity by powering an electrical generator, is to use a power turbine. The power turbine may comprise an exhaust gas driven turbine wheel mounted on a rotatable shaft which drives the electrical generator.

The exhaust driven turbine wheel of the power turbine may be driven so fast that the attached electrical generator cannot effectively generate electrical power, due to operational limitations of the electrical generator. For this reason, some power turbines may include gearing between the turbine wheel and the electrical generator to reduce the speed at which the electrical generator is driven by the turbine wheel to within the operational limitations of the electrical generator. However, such gearing may be complex, costly and prone to failure.

It is an object of the present invention to provide a generator arrangement and/or a method of operating a generator arrangement which obviates or mitigates at least one of the above described disadvantages or disadvantages present in the prior art. It is another object of the present invention to provide a method of operating a generator arrangement which utilises improved control methods.

According to a first aspect of the invention there is provided a method of operating a generator arrangement comprising selecting an operating mode as a function of at least one of: a speed of an engine, a temperature of at least a portion of the engine, a property of an exhaust fluid of the engine, and whether an engine braking command signal is received by the controller; controlling the flow of fluid from a first engine outlet to a first turbine by setting, based on the selected operating mode, an operating condition of a first flow control mechanism, the first turbine being part of a turbocharger having a compressor in fluid flow communication with an engine inlet; and controlling the flow of fluid from a second engine outlet to a second turbine by setting, based on the selected operating mode, an operating condition of a second flow control mechanism, the second turbine being parallel to the first turbine and being part of an electrical generator.

The first engine outlet and the second engine outlet may be one and the same.

The first flow control mechanism may comprise a variable geometry turbine mechanism, a valve or a wastegate.

The second flow control mechanism may comprise a variable geometry turbine mechanism, a valve or a wastegate.

When the engine operates at an idling speed and when at least a portion of engine is at a temperature which is less than a normal operating temperature of the portion of the engine, said selecting may comprise selecting a cold idle operating mode; wherein in the cold idle operating mode, said setting an operating condition of the first flow control mechanism comprises substantially closing the first flow control mechanism such that fluid substantially cannot pass through the first turbine and substantially cannot bypass the first turbine; and wherein in the cold idle operating mode, said setting an operating condition of the second flow control mechanism comprises partially or fully opening the second flow control mechanism such that fluid can flow through the second turbine.

When the engine operates at idling speed and when at least a portion of the engine is at a temperature which is a normal operating temperature of the portion of the engine, said selecting may comprise selecting an idling operating mode; wherein in the idling operating mode, said setting an operating condition of the first flow control mechanism comprises substantially fully opening the first flow control mechanism such that fluid can pass through the first turbine or bypass the first turbine; and wherein in the idling operating mode, said setting an operating condition of the second flow control mechanism comprises substantially fully opening the second flow control mechanism such that fluid passes through the second turbine or bypass the second turbine.

When the engine operating speed is increasing, said selecting may comprise selecting an accelerating operating mode; wherein in the accelerating operating mode, said setting an operating condition of the first flow control mechanism comprises substantially fully opening the first flow control mechanism such that fluid can pass through the first turbine; and wherein in the accelerating operating mode, said setting an operating condition of the second flow control mechanism comprises substantially fully closing the second flow control mechanism such that fluid substantially cannot pass through the second turbine and substantially cannot bypass the second turbine.

When the engine operating speed is a substantially constant speed and is greater than the idling speed of the engine, said selecting may comprise selecting a steady state operating mode; and wherein in the steady state operating mode, said setting an operating condition of the second flow control mechanism comprises at least partially opening the second flow control mechanism thereby opening a bypass path around the first turbine via the second turbine, such that gas flowing through the bypass path can pass from the first engine outlet to an arrangement outlet via the second turbine and without passing through the first turbine.

When an engine braking command signal is received by the controller, said selecting may comprise selecting an engine braking operating mode; and wherein in the engine braking operating mode, said setting an operating condition of the first flow control mechanism comprises at least partially closing the first flow control mechanism so as to reduce the flow of exhaust gas through the first turbine and thereby increase the pressure of fluid in the first engine outlet, and hence increase the back pressure of the fluid on the engine.

The method may further comprise controlling the flow of fluid through an exhaust gas recirculation path between the first and/or second engine outlet and the engine inlet by setting, based on the selected operating mode, an operating condition of the first flow control mechanism and/or second flow control mechanism.

When the a property of the engine exhaust falls outside of a predetermined range, said selecting may comprise selecting a reduced exhaust gas recirculation operating mode; wherein in the reduced exhaust gas recirculation operating mode, said setting an operating condition of the first flow control mechanism comprises opening the first flow control mechanism such that rate of fluid flowing through the first turbine or bypassing the first turbine is increased; and/or wherein in the reduced exhaust gas recirculation operating mode, said setting an operating condition of the second flow control mechanism comprises opening the second flow control mechanism such that the rate of fluid flowing through the second turbine or bypassing the second turbine is increased, and wherein the flow of fluid through an exhaust gas recirculation path is reduced.

When the a property of the engine exhaust falls outside of a predetermined range, said selecting may comprise selecting a increased exhaust gas recirculation operating mode; wherein in the increased exhaust gas recirculation operating mode, said setting an operating condition of the first flow control mechanism comprises closing the first flow control mechanism such that rate of fluid flowing through the first turbine or bypassing the first turbine is decreased; and/or wherein in the increased exhaust gas recirculation operating mode, said setting an operating condition of the second flow control mechanism comprises closing the second flow control mechanism such that the rate of fluid flowing through the second turbine or bypassing the second turbine is decrease and wherein the flow of fluid through an exhaust gas recirculation path is increased.

According to a second aspect of the invention there is provided a computer program comprising computer readable instructions configured to cause a processor to carry out any of the preceding methods.

According to a third aspect of the invention there is provided a computer readable medium carrying a computer program as described above.

According to a fourth aspect of the invention there is provided a generator arrangement comprising a turbocharger having a compressor configured to be placed in fluid flow communication with an engine inlet, and a first turbine configured to be placed in fluid flow communication with a first engine outlet, an electrical generator having a second turbine configured to be placed in fluid flow communication with a second engine outlet, the first and second turbines being parallel to one another, a first flow control mechanism configured to control the flow of fluid from the first engine outlet to the first turbine, a second flow control mechanism configured to control the flow of fluid from the second engine outlet to the second turbine; and a controller configured to select an operating mode as a function of at least one of: a speed of an engine, a temperature of at least a portion of the engine, a property of an exhaust fluid of the engine, and whether an engine braking command signal is received by the controller, the controller being configured to control the first and second fluid control mechanisms as a function of the selected operating mode.

The first engine outlet and the second engine outlet may be one and the same.

The first flow control mechanism may comprise a variable geometry turbine mechanism, a valve or a wastegate.

The second flow control mechanism may comprise a variable geometry turbine mechanism, a valve or a wastegate.

The controller may be configured such that when the engine operates at an idling speed and when at least a portion of engine is at a temperature which is less than a normal operating temperature of the portion of the engine, said selecting of an operating mode comprises selecting a cold idle operating mode; wherein in the cold idle operating mode, said controller is configured to control the first flow control mechanism to substantially close the first flow control mechanism such that fluid substantially cannot pass through the first turbine and substantially cannot bypass the first turbine; and wherein in the cold idle operating mode, said controller is configured to control the second flow control mechanism to partially or fully open the second flow control mechanism such that fluid can flow through the second turbine.

The controller may be configured such that when the engine operates at idling speed and when at least a portion of the engine is at a temperature which is a normal operating temperature of the portion of the engine, said selecting of an operating mode comprises selecting an idling operating mode; wherein in the idling operating mode, said controller is configured to control the first flow control mechanism to substantially fully open the first flow control mechanism such that fluid can pass through the first turbine or bypass the first turbine; and wherein in the idling operating mode, said controller is configured to control the second flow control mechanism to substantially fully open the second flow control mechanism such that fluid passes through the second turbine or bypass the second turbine.

The controller may be configured such that when the engine operating speed is increasing, said selecting of an operating mode comprises selecting an accelerating operating mode; wherein in the accelerating operating mode, said controller is configured to control the first flow control mechanism to substantially fully open the first flow control mechanism such that fluid can pass through the first turbine; and wherein in the accelerating operating mode, said controller is configured to control the second flow control mechanism to substantially fully close the second flow control mechanism such that fluid substantially cannot pass through the second turbine and substantially cannot bypass the second turbine.

The controller may be configured such that when the engine operating speed is a substantially constant speed and is greater than the idling speed of the engine, said selecting of an operating mode comprises selecting a steady state operating mode; and wherein in the steady state operating mode, said controller is configured to control the second flow control mechanism to at least partially open the second flow control mechanism thereby opening a bypass path around the first turbine via the second turbine, such that gas flowing through the bypass path can pass from the first engine outlet to an arrangement outlet via the second turbine and without passing through the first turbine.

The controller may be configured such that when an engine braking command signal is received by the controller, said selecting of an operating mode comprises selecting an engine braking operating mode; and wherein in the engine braking operating mode, said controller is configured to control the first flow control mechanism to at least partially close the first flow control mechanism so as to reduce the flow of exhaust gas through the first turbine and thereby increase the pressure of fluid in the first engine outlet, and hence increase the back pressure of the fluid on the engine.

The generator arrangement may further comprise an exhaust gas recirculation path between first and/or second engine outlet and the engine inlet, and wherein the controller is configured to control the flow of fluid through the exhaust gas recirculation path by said control of the first and second flow control mechanisms.

According to a fifth aspect of the invention there is provided hybrid electric powertrain comprising a generator arrangement as described above.

Specific embodiments of the present invention will now be described, by way of example only, with reference to the accompanying drawings, in which.

Figure 1:
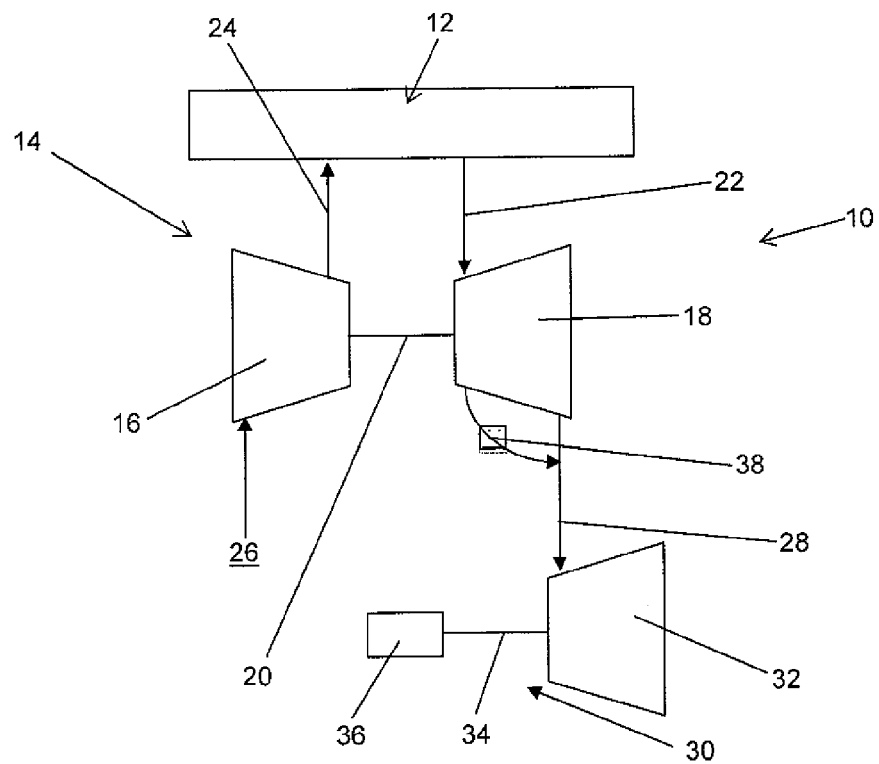
FIG. 1 is a schematic diagram showing the layout of a known generator arrangement.

FIG. 1 shows a known generator arrangement 10. The generator arrangement comprises an engine 12 and an associated turbocharger 14. The turbocharger 14 has a compressor 16 having a compressor wheel (not shown) and a turbine 18 having a turbine wheel (also not shown). The compressor wheel and turbine wheel are linked by a rotatable shaft 20.

The engine 12 has an engine exhaust outlet 22. An inlet to the turbine 18 of the turbocharger 14 is connected to the engine outlet 22 such that the turbine 18 is in fluid flow communication with the engine outlet 22. Exhaust gases produced by the engine 12 are provided to the turbine 18 via the engine outlet 22 and cause the turbine wheel within the turbine 18 to rotate. Rotation of the turbine wheel, and hence the attached shaft 20, results in the rotation of the compressor wheel within the compressor 16.

The compressor 16 is connected to an engine inlet 24 in a manner such that the compressor 16 is in fluid flow communication with the engine inlet 24. The compressor 16 is also connected to a fluid source 26. In this case, the fluid concerned is a gas, and more particularly, is air. The fluid source 26 in this case is the atmosphere.

As previously discussed, the compressor wheel within the compressor 16 is rotated via the shaft 20 due to the rotation of the turbine wheel within the turbine 18 caused by the passage of exhaust gas through the turbine 18. Rotation of the compressor wheel within the compressor 16 results in the compressor 16 supplying fluid from the fluid source 26 to the engine 12 via the engine inlet 24. The pressure of the fluid supplied to the engine inlet 24 by the compressor 16 is at a higher pressure (also known as boost pressure) compared to that of the fluid at the fluid source 26.

The turbine 18 has an outlet 28 to which exhaust gas passes once it has passed through the turbine 18 from the engine outlet 22.

The generator arrangement 10 also has an electrical generator 30. The electrical generator 30 comprises a turbine 32 having a turbine wheel (not shown). The turbine wheel is linked via a shaft 34 to a transducer 36. In this case, the transducer 36 is an electric generator. The transducer 36 operates such that rotation of the turbine wheel of the turbine 32 causes rotation of the shaft 34, and rotation of the shaft 34 results in the transducer 36 producing electrical power. Exhaust gas that is provided to the turbine 32 via the turbine outlet 28 from the turbine 18 causes the turbine wheel within the turbine 32 to rotate and hence the generator 30 generates electrical power.

The turbine 32 of the generator 30 is connected to the turbine outlet 28 such that the turbine outlet 28 and turbine 32 are in fluid flow communication with one another.

Exhaust gas from the engine 12 which passes through the turbine 18 of the turbocharger and then passes to the turbine 32 of the generator and hence rotates the turbine wheel within the turbine 32. This causes the transducer 36 of the generator 30 to produce electrical power. The electrical power may then be stored (for example, using batteries) or utilised in any other appropriate manner as would be appreciated by the person skilled in the art.

Due to the fact that the inlet of the turbine 32 of the generator 30 is in fluid flow communication with the outlet of the turbine 18 of the turbocharger 14, such that the turbine 32 of the generator 30 is downstream of the turbine 18 of the turbocharger 14, the turbocharger 14 and generator (or power turbine) 30 may be said to be arranged in series.

The turbine 18 of the turbocharger 14 within the generator arrangement 10 is provided with a wastegate valve indicated generally by 38. The wastegate valve 38 can be used to define a flow path which can be selectively opened or closed and which allows exhaust gas produced by the engine to substantially bypass the turbine 18 of the turbocharger 14. When the wastegate valve 38 is open exhaust gas may flow from the engine outlet 22 to the turbine outlet 28 such that substantially less exhaust gas passes the turbine wheel in the turbine 18 compared to when the wastegate valve 38 is closed. In some embodiments, substantially no exhaust gas may pass the turbine wheel within the turbine 18 when the wastegate valve 38 is open.

It will be appreciated that by opening the wastegate valve 38 (and therefore reducing the amount of exhaust gas which passes from the engine 12 to the turbine wheel of the turbine 18) the force exerted on the turbine wheel of the turbine by exhaust gases from the engine is reduced. This results in a reduction in the speed of rotation of the turbine wheel, and hence a reduction in the speed of rotation of the compressor wheel (caused by the rotation of the turbine wheel). This reduction in the speed of rotation of the compressor wheel of the compressor 16 results in a reduction in the rate at which fluid which is transferred to the engine by the compressor 16 via the engine inlet 24.

Furthermore, opening the wastegate valve 38, by allowing the exhaust gas produced by the engine 12 to bypass the turbine 18 of the turbocharger 14 and therefore to pass directly to the turbine 32 of the generator 30 will increase the proportion of the energy of the exhaust gas which is passed to the turbine 32 of the generator 30 and therefore converted to electrical power by the transducer 36.

One disadvantage of this generator arrangement is that the size of the turbine wheel within the generator 30 has to be relatively large to accommodate a full flow of the exhaust gas given the partial pressure ratio of such turbines. Such a relatively large turbine wheel may be costly to produce and may be difficult to package. Furthermore, there is limited control over the operation of the generator arrangement in conjunction with the operating condition of the engine 12. For example, it is only possible to control how much exhaust gas is allowed to bypass the turbine 18 of the turbocharger and hence how much exhaust gas passes to the turbine 32 of the generator 30 without passing through the turbine 18 of the turbocharger 14. Also, all exhaust gas always passes through the turbine 32. In some operation modes of the engine this may not be required and/or desirable.

Figure 2:
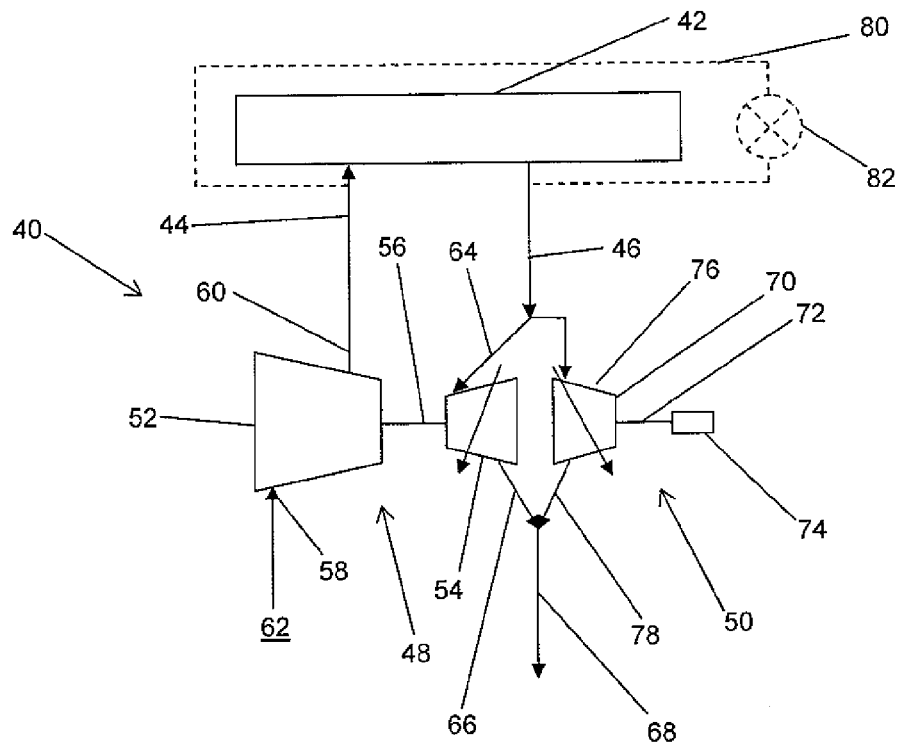
FIG. 2 is a schematic diagram showing the layout of a first generator arrangement which may be operated as part of a method according to the present invention.

FIG. 2 shows a schematic diagram of a first generator arrangement 40 which may be operated as part of a method according to the present invention. The generator arrangement 40 comprises an engine 42 having an engine inlet 44 and an engine outlet 46. The engine inlet 44 and engine outlet 46 may be referred to as the engine inlet manifold and the engine outlet manifold respectively. The generator arrangement further comprises a variable geometry turbocharger 48 and a generator 50.

The variable geometry turbocharger 48 comprises a compressor 52 housing a compressor wheel (not shown), and a variable geometry turbine 54 housing a turbine wheel (not shown). The turbine wheel and compressor wheel are linked by an intermediate shaft 56.

The compressor 52 of the variable geometry turbocharger 48 has an inlet 58 and an outlet 60. The outlet 60 of the compressor 52 is arranged such that it is in fluid flow communication with the engine inlet 44. The inlet 58 of the compressor 52 is arranged such that it is in fluid flow communication with a gas source 62. In this case, the gas is air and the gas source 62 is the atmosphere.

Although in this embodiment of the present invention (and in all further embodiments of the invention discussed below) the fluid source is a gas source (i.e. the atmosphere) in fluid flow communication with the inlet of the compressor of the turbocharger, it will be appreciated that in other embodiments of the invention the gas source may be replaced by another fluid source. For example the fluid source may be a liquid source. Alternatively, a gas source other than the atmosphere, may be used. Alternatively, a gas other than air, and a source of gas other than a source of air may be used.

The variable geometry turbine 54 of the turbocharger 48 has an inlet 64 and an outlet 66. The inlet 64 of the turbine 54 is arranged such that it is in fluid flow communication with the engine outlet 46. The outlet 66 of the turbine 54 is arranged such that it is in fluid flow communication with an arrangement outlet 68.

Due to the fact that the turbine of the turbocharger 48 is a variable geometry turbine, the size of the inlet 64 can be varied using a variable geometry mechanism (not shown) so as to optimise the flow velocity of gas flowing through the inlet over a range of mass flow rates of the engine exhaust gas. This enables the power outlet of the turbine 54 to be varied to suit different engine operating conditions. For example, when the volume of exhaust gas being delivered to the turbine is relatively low, the velocity of the gas reaching the turbine wheel can be maintained at a level which ensures efficient turbine operation by reducing the size of the inlet using the variable geometry mechanism. Two known types of variable geometry turbine are swing vane turbines and sliding nozzle turbines. The structure and operation of such turbines is well known to those skilled in the art.

The generator 50 comprises a variable geometry turbine 70 housing a turbine wheel (not shown) which is linked via a shaft 72 to a transducer 74.

The transducer 74 is configured such that it can convert rotation of the shaft 72 into a desired form of power. For example, the transducer may convert the rotation of the shaft 72 into different motion. However, in this case, the transducer 74 converts rotation of the shaft 72 into electrical power. For this reason, the transducer 74 may be referred to as an electric generator.

A turbine which is connected to a transducer such that the transducer converts the rotation of the turbine wheel within the turbine into another type of power may be referred to as a power turbine.

The turbine 70 of the generator 50 is a variable geometry turbine and has a variable geometry inlet 76 and an outlet 78. The turbine 70 may be arranged such that the flow of the exhaust gas into the turbine 70 via the inlet 76 is substantially perpendicular to the axis about which the generator shaft 72 rotates. It follows that the turbine 70 may be referred to as a radial-inflow turbine.

The outlet 78 of the turbine 70 is arranged such that it is in fluid flow communication with the arrangement outlet 68. The inlet 76 of the turbine 70 is arranged such that it is in fluid flow communication with the engine outlet 46.

Due to the fact that the inlet 64 of the turbine 54 of the turbocharger 48 and the inlet 76 of the turbine 70 of the generator 50 are both in fluid flow communication with the engine outlet 46, the turbocharger 48 and generator (or power turbine) 50 may be said to be arranged in parallel.

It will be appreciated that, although the inlet 64 of the turbine 54 and the inlet 76 of the turbine 70 are both connected so that they are in fluid flow communication with a single engine outlet 46, this need not be the case in some embodiments of the present invention. For example, the inlet 64 of the turbine 54 of the turbocharger 48 may be connected such that it is in fluid flow communication with a first engine outlet, whereas the inlet 76 of the turbine 70 of the generator 50 may be connected such that it is in fluid flow communication with a second engine outlet. For example, the first engine outlet may be linked to a first exhaust manifold which receives exhaust from a first set of engine cylinders, whereas the second engine outlet may be linked to a second exhaust manifold which has exhaust provided to it by a second set of engine cylinders. This arrangement, whereby the inlet of the turbine of the turbocharger is connected such that it is in fluid flow communication with a first engine outlet, and whereby the inlet to the turbine of the generator is connected such that it is in fluid flow communication with a second exhaust outlet of the engine may also be applied any of the embodiments of the invention discussed below.

Within the embodiment of the invention shown in FIG. 2, the outlet 66 of the turbine 54 of the turbocharger 48 and the outlet 78 of the turbine of the generator 50 are both in fluid flow communication with the arrangement outlet 68. This need not be the case in other embodiments of the invention. For example, in some embodiments, the outlet of the turbine of the turbocharger, and the outlet of the turbine of the generator may be in fluid flow communication with separate outlets. This applies equally to other embodiments of the invention discussed below.

The generator arrangement shown in FIG. 2 operates as follows. When the engine 42 is operating it produces exhaust gas which is supplied to the engine exhaust outlet 46. The exhaust gas then flows from the engine outlet 46 to both the inlet of the turbine of the turbocharger 48 and the inlet 76 of the turbine 70 of the generator 50.

In relation to the turbine 54 of the turbocharger 48, the exhaust gas passes from the turbine inlet 64 via a variable geometry mechanism (not shown) into the turbine 54 and past a turbine wheel (not shown). As the exhaust gas passes the turbine wheel it imparts a force to the turbine wheel and hence causes the turbine wheel to rotate. The exhaust gas then flows out of the turbine 54 via the turbine outlet 66 to the arrangement outlet 68.

In relation to the turbine 70 of the generator 50, the exhaust gas passes from the turbine inlet 76 into the turbine 70 and via variable geometry mechanism (not shown) such that the exhaust gas passes the turbine wheel (not shown) of the turbine 70. As the exhaust gas passes the turbine wheel it exerts a force on the turbine wheel thereby causing the turbine wheel to rotate. Once the exhaust gas has flowed past the turbine wheel of the turbine 70 it flows out of the turbine 70 via the turbine outlet 78 and into the arrangement outlet 68.

In the case of the generator 50, rotation of the turbine wheel within the turbine 70 causes rotational movement to be transmitted to the transducer 74 (an electric generator in this case) via the shaft 72. The transducer 74 produces a power output (in this case electrical power). The power generated by the transducer 74 may then be stored (for example by batteries) or utilised to power another device. For example, if the generator arrangement is utilised as part of a hybrid electric engine, the transducer 74 may produce electric power which is supplied to the electric propulsion system. The electric power supplied to the electric propulsion system may power a motor.

In relation to the turbocharger 48, rotation of the turbine wheel of the turbine 54 by the exhaust gas results in the compressor wheel within the compressor 52 being rotated via the shaft 56. Rotation of the compressor wheel within the compressor 52 causes the compressor to draw gas (air in this case) from the gas source 62 into the compressor 52 via the inlet 58. The air then passes the compressor wheel within the compressor 52 and is urged by the compressor in an upstream direction to the engine inlet 44 via the compressor outlet 60.

As previously discussed, within the generator arrangement shown in FIG. 2, the arrangement of the turbines 54 and 70 of the turbocharger 48 and generator 50 such that their respective inlets 64 and 76 are both connected to the engine outlet 46 (or in other embodiments separate engine outlets) means that the turbocharger 48 and generator 50 can be said to be arranged in parallel to one another.

The arrangement of the turbocharger 48 and generator 50 in parallel (as opposed to the series arrangement of turbocharger and generator shown in FIG. 1) is beneficial for several reasons.

Due to the fact that the turbine of the generator of the parallel arrangement is connected to the engine outlet 46, as opposed to being downstream of the turbocharger in the series arrangement shown in FIG. 1, the turbine 70 of the generator 50 is exposed to the full pressure ratio of exhaust gas produced by the engine 42. By exposing the turbine 70 of the generator 50 to the full pressure ratio of exhaust gas, the size of the turbine 70 can be reduced compared to the required size of turbine in a series arrangement. This is because the power output by the turbine is a function of the pressure of the gas supplied to the turbine and of the size (and hence surface area) of the turbine wheel of the turbine. By increasing the pressure ratio (and hence the pressure) of gas supplied to the turbine the size of the turbine wheel of the turbine (and hence the surface area of the turbine wheel) can be reduced without reducing the power produced by the turbine. A reduction in the size of the turbine wheel means that less material is required in order to manufacture the turbine wheel and hence the cost of producing the turbine wheel is reduced.

Another effect of reducing the size of the turbine wheel is that the transient response of the turbocharger of which the turbine forms part is improved. That is to say that the time required to rotate the turbine wheel (and hence the compressor wheel) up to a speed at which the turbocharger can effectively supply air to the engine at boost pressure is reduced. This time may also be referred to as turbo lag. Turbo lag is reduced by reducing the size of the turbine wheel because reducing the size of the turbine wheel reduces its moment of inertia and hence reduces the torque required to accelerate the turbine wheel (and attached compressor wheel) to a given rotational speed. Hence, reducing turbo lag improves the performance of the turbocharger and the engine to which the turbocharger is attached.

A further effect of reducing the size of the turbine wheel of the turbine 70 of the generator 50 is that, for a given mass flow rate and pressure of gas provided to the turbine 70, the speed at which the turbine wheel (and hence the attached shaft 72 supplying the transducer 74) will rotate is greater than for a larger sized turbine wheel.

Previous known electrical generators have not been capable of operating at the high rotational speeds which are achieved by the smaller sized turbine wheel of the generator. However, certain transducers, such as recently developed and future planned electrical generators, may operate at the high speed of rotation achieved by the smaller sized turbine wheel of the generator. Operating the transducer at a higher speed of rotation may be beneficial. For example, certain transducers may produce more power output when they are rotated at a greater speed. For example, certain electrical generators may produce more electrical power when they are rotated at a greater speed. Hence, in the case of transducers which are suited to the greater rotational speeds (such as certain electrical generators) produced by the smaller turbine wheel of the generator turbine, it has been found that there is a synergistic effect provided by the generator arrangement according to the present invention whereby a smaller turbine may be used as part of the generator which both reduces the cost of the turbine and increases the power which can be produced by the transducer of the generator.

The generator arrangement according to the present invention shown in FIG. 2 comprises two flow control mechanisms which each control the flow of exhaust gas through a portion of the generator arrangement. The variable geometry mechanism of the turbine 54 of the turbocharger 48 is a first flow control mechanism. The first flow control mechanism (in this case the variable geometry mechanism of the turbine 54) is configured to control the flow of exhaust gas from the engine outlet 46 to the turbine 54. The variable geometry mechanism of the turbine 70 of the generator 50 constitutes a second flow control mechanism. The second flow control mechanism is configured to control the flow of exhaust gas from the engine outlet 46 to the turbine 70. In contrast to the generator arrangements of the present invention, the known generator arrangement shown in FIG. 1 has only a single flow control mechanism. In this case the flow control mechanism is the wastegate valve 38. The wastegate valve 38 controls the flow of exhaust gas to the turbine of the turbocharger of the known generator arrangement by allowing exhaust gas to selectively bypass the turbine of the turbocharger.

A person skilled in the art would not seek to add a second flow control mechanism in accordance with the present invention to known generator arrangements, such as that shown in FIG. 1, because to do so would be deemed to be prohibitively expensive because flow control mechanisms are expensive. However, the applicant has found that unexpectedly the advantages of the generator arrangement according to the present invention which are discussed below outweigh the significant additional cost of including a second flow control mechanism.

The provision of two flow control mechanisms within the present invention provides several advantages. The use of two flow control mechanisms allows the ratio of exhaust gas provided to each of the turbines 54 and 70 to be controlled. This allows the ratio of power produced by the turbocharger to that produced by the generator to be controlled more effectively than the prior art. For example, the use of two flow control mechanisms may provide a greater range of possible ratios or greater ability to accurately select a particular desired ratio.

Some embodiments of the generator arrangement according to the present invention may include an exhaust gas recirculation EGR path. Such an EGR path is indicated in dashed lines in FIG. 2 and labelled 80. The EGR path 80 links the engine outlet 46 to the engine inlet 44. The EGR path 80 allows a portion of the engine exhaust gas to be recirculated to the engine inlet 44. This leads to a reduction in the temperature of combustion within the engine and hence a reduction in the amount of certain pollutants produces, for example the amount of nitrogen oxides produced. The EGR path may have a cooler (not shown) which cools the gas passing through it. The EGR path 80 also has an EGR control valve 82. The control valve 82 allows the EGR path 80 to be selectively opened and closed depending on the engine operating conditions.

In order for exhaust gas to flow from the engine outlet 46 to the engine inlet 44 via the EGR path 80, the EGR valve 82 will be at least partially open and there must be a pressure difference between the engine outlet 46 and engine inlet 44 such that the pressure of the exhaust gases in the engine outlet is greater than the pressure of the fluid (in this case air) in the engine inlet 44.

The provision of two flow control mechanisms within the generator arrangement in accordance with the present invention enables the amount of exhaust gas that is recirculated via an EGR path to be controlled. This is because the two fluid control mechanisms of the present invention allow both the flow passage for exhaust gas through the turbine of the turbocharger 48 and the flow passage for exhaust gas through the turbine of the generator 50 to be at least partially closed. At least partially closing at least one of (or both of) the flow passageways through both the turbines 54 and 70 will result in an increase in pressure of the exhaust gases in the engine outlet 46. This is because at least partially closing at least one of (or both of) the flow passageways through the turbines 54 and 70 will restrict the flow of the exhaust gases from the engine outlet to the arrangement outlet 68. By increasing the pressure of the exhaust gases in the engine outlet 46, the pressure difference between the gas in the engine outlet 46 and the fluid (in this case, air) in the engine inlet 44, and hence will increase the flow of exhaust gas from the engine outlet 46 to the engine inlet 44 via the EGR path 80.

The provision of two flow control mechanisms according to the present invention allows for greater control of the pressure within the engine outlet 46 and hence a greater control over the flow of exhaust gases from the engine outlet 46 to the engine inlet 44 via an EGR flow path. Furthermore, the provision of two flow control mechanisms in accordance with the present invention allows the flow of exhaust gas through the EGR path 80 to be controlled simultaneously whilst controlling the ratio of gas flow through the turbine 54 of the turbocharger 48, to that through the turbine 70 of the generator 50 (and hence controlling the ratio of power produced by the turbine 54 and the turbine 70).

The presence of two flow control mechanisms according to the present invention (which allows the flow passageway through at least one of (or both of) the turbine 54 of the turbocharger and the turbine 70 of the generator 50 to be at least partially closed) enables the generator arrangement to be operated in several operating modes which would not be possible using a prior art generator arrangement such as that shown in FIG. 1. These operating modes of the generator arrangement according to the present invention will be discussed below.

Figure 5:
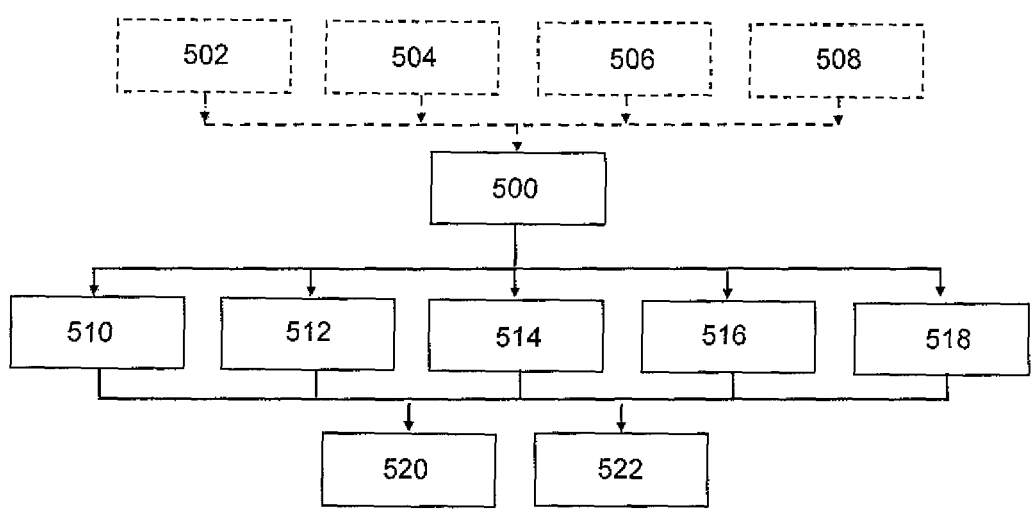
FIG. 5 is a flow chart showing the steps involved in carrying out a method of operating a turbo-compound engine in accordance with an embodiment of the present invention.

As shown in FIG. 5, a controller may control the operation of the generator arrangement. For example, the controller may select (box 500) a particular operating mode (boxes 510, 512, 514, 516, 518) of the generator arrangement depending on the operating mode of the engine or any other suitable factor, for example determining that engine braking is required. If engine braking is required, an engine braking command signal (box 502) may be provided to the controller. The engine braking signal may be an electric signal which is provided to the controller when a switch is closed, but any other appropriate control signal which can be used to signal the controller that engine braking is required may be used. Other factors which the controller may use to determine the generator arrangement operating mode include the engine speed (box 504), a property of an exhaust fluid of the engine (e.g. a property of exhaust gas produced by the engine, box 506) and the temperature of at least a portion of the engine (box 508). Signals which indicate the engine speed and the temperature of at least a portion of the engine may be provided by a speed sensor or a temperature sensor as will be readily appreciated by a person skilled in the art. Properties of the exhaust fluid (in this case gas) produced by the engine which may be measured include the concentration of a particular substance within the fluid (e.g. nitrogen oxides ($NO_x$), oxygen, carbon dioxide and/or nitrogen), the temperature of the exhaust fluid and the pressure of the exhaust fluid. A property of the exhaust fluid may be measured by any appropriate sensor and said sensor will provide a signal to the controller which is indicative of the measured property of the exhaust fluid.

When the engine is in a cold idle operating mode the engine runs at idling speed. Also, the engine is relatively cold, for example, because the engine has only recently been started. With the engine in a cold idle operating mode, the generator arrangement may operate in a cold idle operating mode (box 510) such that the flow control mechanism (in this case a variable geometry mechanism) of the turbocharger 48 is substantially closed (box 520) so that exhaust gas substantially cannot pass through the turbine 54. By closing the flow control mechanism of the turbine 54 the pressure of the exhaust gas at the engine outlet 46 (also referred to as the back pressure on the engine) is increased. The increase in back pressure on the engine 42 means that the engine will have to exert more effort in order to run and as such more fuel will have to be supplied to the engine in order for it to maintain its idling speed. The increase in the amount of fuel supplied to the engine will cause the engine operating temperature to increase (or warm up) at a faster rate compared to that when there is no back pressure on the engine due to the closure of the flow control mechanism of the turbine 54. The increase in the amount of fuel supplied to the engine may also cause the engine exhaust system temperature to increase at a faster rate.

In some engines, faster warming up of a portion of the engine or the engine exhaust system to a normal operating temperature may be beneficial because there may be at least one catalyst present within the engine or the engine exhaust system which is such that it functions best at the normal operating temperature.

Whilst the engine is in a cold idle operating mode (and hence the generator arrangement is operating in a cold idle operating mode), the flow control mechanism of the turbine 70 of the generator 50 may be partially or fully open (box 522) such that exhaust gas can flow from the engine outlet 46 to the turbine wheel of the turbine 70 of the generator 50. This may be beneficial because the idling engine can generate electrical power. Such generation of electrical power may be used to recharge a battery. In the case where an engine has only recently been started a battery connected to the engine, which has been used to crank the engine in order to start the engine, may have been depleted by cranking the engine. It follows that if the transducer 74 of the generator 50 is connected to a battery that has been depleted in such a manner, then the generator 50 of the generator arrangement operating in the cold idle operating mode can recharge the battery after being depleted.

An internal combustion engine may be connected to an alternator which is rotated by the movement of the engine. Rotation of the alternator generates electric power. Rotation of the alternator by the engine after cranking the engine may be used to recharge a battery which has been depleted by cranking the engine. Even in the case of some hybrid electric engines, the alternator is often retained on the internal combustion engine portion of the hybrid electric engine because the batteries need to be recharged as soon as possible after engine starting (due to batteries being drained during cranking). A generator arrangement according to the present invention is capable of generating electric power without the need for an alternator. In particular, when operating in a cold idle operating mode, a generator arrangement according to the present invention can be used to recharge batteries that have recently been used to crank the engine, without the need for an alternator. It follows that a generator arrangement according to the present invention may remove the need for an alternator. The ability to omit the alternator from an engine may be beneficial because it may reduce the cost and complexity of the engine.

The engine 42 may operate in an idle operating mode. In the idle operating mode, the engine runs at idling speed. In the idle operating mode of the engine, the engine is at a normal operating temperature, which differentiates this operating mode of the engine from the cold idle operating mode. When the engine is operating in the idle operating mode, the generator arrangement may be operating in an idle operating mode (box 512) in which both the flow control mechanism of the turbine 54 of the turbocharger 48 and the flow control mechanism of the turbine 70 of the generator 50 (both of which in this case are variable geometry mechanisms) are substantially fully open (boxes 520, 522) so that exhaust gases can flow through both the turbine 54 and the turbine 70. This minimises the back pressure on the engine and hence minimises the amount of fuel that must be supplied to the engine in order for it to maintain idle speed. Consequently, fuel consumption is minimised.

In an acceleration operating mode of the engine, the engine operating speed is increasing. In this operating mode of the engine, the generator arrangement may be in an acceleration operating mode (box 514) and is operated such that the flow control mechanism (in this case a variable geometry mechanism) of the turbine 70 of the generator 50 is substantially closed (box 522) and the flow control mechanism (in this case a variable geometry mechanism) of the turbine 54 of the turbocharger 48 is substantially fully open (box 520). Consequently, in this operating mode of the generator arrangement, substantially no exhaust gas output by the engine passes through the turbine 70 of the generator 50 and a majority of the exhaust gas produced by the engine passes through the turbine 54 of the turbocharger 48. In this manner, a substantial portion (and in some cases substantially all) of the exhaust gas produced by the engine 42 is used to power the turbocharger 48 such that the turbocharger operates to maximise the amount of air provided to the engine inlet and thereby increase the performance of the engine.

In a steady state operating condition of the engine, the engine is running at a substantially constant speed which is greater than the idling speed of the engine. When the engine is in the steady state operating condition, the generator arrangement may be operated in a steady state operating mode (box 516) in which the flow control mechanism (in this case variable geometry mechanism) of the turbine 70 of the generator 50 is at least partially open (box 522). With the flow control mechanism of the turbine 70 being at least partially open, a bypass path around the turbine 54 of the turbocharger (i.e. a path by which exhaust gas can pass to the arrangement outlet 68 without travelling through the turbine 54) is created by the turbine 70 of the generator 50. This bypass path results in at least part of the exhaust gas produced by the engine 42 bypassing the turbine 54 of the turbocharger 48 such that the turbocharger 48 (and in particular the turbine 54 of the turbocharger 48) does not rotate at an excessive speed which may be detrimental to the performance and/or integrity of the turbocharger 48. With the generator arrangement operating in this mode, the exhaust gas which bypasses the turbine 54 of the turbocharger 48 passes to the turbine 70, thereby powering the generator 50 and enabling the generator 50 to produce electrical power. This electrical power can then be used or stored as appropriate.

The generator arrangement may also be used in an engine braking mode. When the generator arrangement is operated in an engine braking mode (box 518), the flow control mechanism (in this case a variable geometry mechanism) of the turbine 54 of the turbocharger 48 is at least partially closed (box 520) so as to increase the pressure of exhaust gases in the engine outlet 46. By increasing the exhaust gas pressure in the engine outlet 46, there is an increase in the back pressure on the engine which opposes the movement of the pistons within the engine, thus opposing the movement of the engine. For example, in a case where the engine is attached to drive wheels of vehicle, the back pressure on the engine will oppose movement of the drive wheels, thus producing a braking effect. It is common for no fuel to be provided to the cylinders of the engine during an engine braking operating mode. Whilst the flow control mechanism of the turbine 54 of the turbocharger 48 is at least partially closed during an engine braking mode, the flow control mechanism of the turbine 70 of the generator 50 may be at least partially opened so as to cause the exhaust gases to pass through the turbine 70 and thus cause the generator 50 to produce electrical power. As previously discussed, this electrical power may either be used to power a desired device at the moment in time that the power is generated and/or the power may be stored so that it may be used at a later point in time.

In embodiments of the generator arrangement according to the present invention which comprise an exhaust gas recirculation path, the property of the exhaust gas which is measured may be the concentration of nitrogen oxides ($NO_x$) and/or the pressure. At least one signal which is indicative of at least one of these properties of the exhaust gas may be provided to the controller. The controller may be configured to control the flow of fluid through the exhaust gas recirculation path by control of the first and second flow control mechanisms. For example, if the pressure of the exhaust gas is relatively high (e.g. greater than a desired level) and/or the concentration of nitrogen oxides ($NO_x$) present in the exhaust gas is relatively low (i.e. below a predetermined level) then the controller may select a reduced EGR operating mode and at least one of the first and second control mechanisms may be controlled by the controller such that they are opened. This will result in the pressure of the exhaust gas being reduced and will consequently reduce the amount of gas flow through the exhaust gas recirculation path. Conversely, if the pressure of the exhaust gas is relatively low (e.g. less than a desired level) and/or the concentration of nitrogen oxides ($NO_x$) present in the exhaust gas is relatively high (e.g. above a predetermined level) then the controller may select an increased EGR operating mode and at least one of the first and second control mechanisms may be controlled by the controller such that they are closed. This will result in the pressure of the exhaust gas being increased and will consequently increase the amount of gas flow through the exhaust gas recirculation path.

It will be appreciated that it is within the scope of the invention for the generator arrangement to be operable in any combination of the operating modes described above.

In some embodiments of the invention, the use of the generator arrangement in an engine braking operating mode may result in low pressure within the compressor 52 of the turbocharger 48. In some embodiments, the shaft 56 of the turbocharger 48 may be supported by a bearing arrangement (not shown) within a bearing housing (also not shown). The bearing arrangement may be lubricated with oil. The low pressure of the compressor 52 of the turbocharger 48 in some embodiments of the invention whilst operating in an engine braking operating mode may be problematic because oil from the bearing arrangement (not shown) which supports the shaft 56 may leak from the relatively high pressure environment of the bearing arrangement to the relatively low pressure environment of the compressor 52. Oil leaking into the compressor 52 may be disadvantageous because the oil may contaminate the compressor 52, the engine inlet 44, and/or the engine 42. Contamination of the compressor 52, the engine inlet 44, and/or the engine 42 may reduce the performance of the compressor 52 and/or engine 42. In extreme cases, contamination of the compressor 52, the engine inlet 44 and/or the engine 42 may result in the failure of the compressor 52 and/or engine 42.

Figure 3:
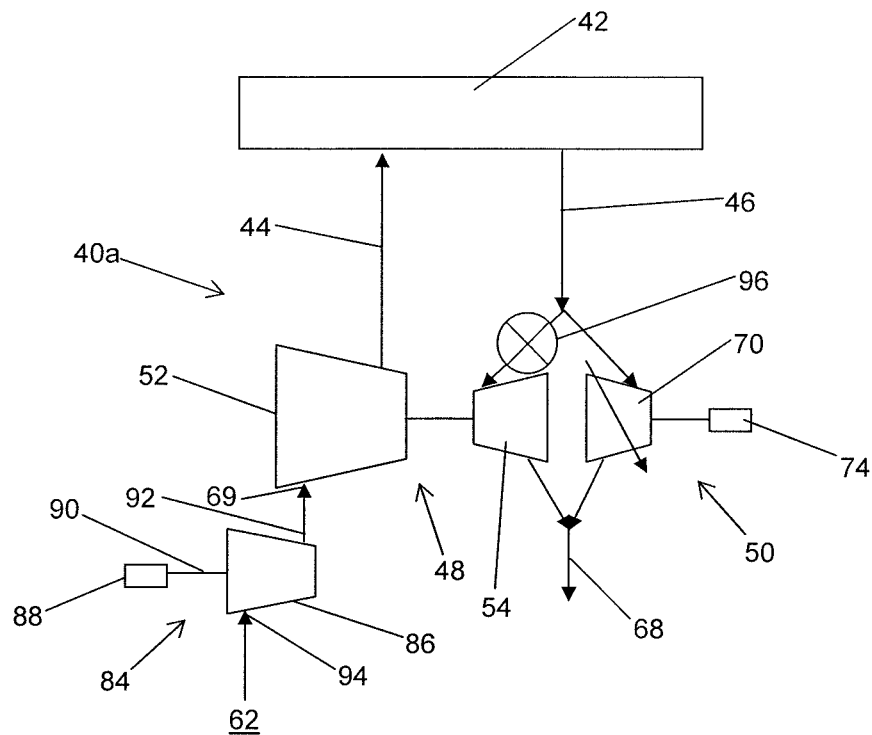
FIG. 3 is a schematic diagram showing the layout of a second generator arrangement which may be operated as part of a method according to the present invention.

FIG. 3 shows a second generator arrangement 40a which may be operated as part of a method according to the present invention. Features of the generator arrangement 40a shown in FIG. 3 that are substantially the same as features of the generator arrangement shown in FIG. 2 have been given the same numbering.

The generator arrangement 40a shown in FIG. 3 differs from that shown in FIG. 2 in that it comprises a pre-compressor 84. The pre-compressor 84 comprises a compressor 86 which houses a compressor wheel (not shown) which is rotated by a motor 88 via a shaft 90. In this case, the motor is an electrically powered motor, however, any appropriate motor powered by any appropriate source of power may be used.

The compressor 86 of the pre-compressor 84 is located within the generator arrangement 40a such that an outlet 92 of the compressor 86 is in fluid flow communication with the inlet 69 of the compressor 52 of the turbocharger 48, and such that an inlet 94 of the compressor 86 is in fluid flow communication with the fluid source 62 (in this case the atmosphere).

The provision of the pre-compressor 84 in the embodiment of the invention shown in FIG. 3 may be beneficial for several reasons.

In an engine braking mode of the generator arrangement, as previously discussed, oil leakage may occur into the compressor 52 of the turbocharger 48 due to relatively low pressure within the compressor 52 compared to that of the bearing arrangement. The pre-compressor 84 may be used when the engine of the generator arrangement is in an engine braking operating mode such that the pre-compressor 84 is energised (by energising the motor 88). Energising the pre-compressor 84 will increase the pressure of the fluid (in this case air) within the compressor 52 of the turbocharger 48. By increasing the pressure of the air within the compressor 52 of the turbocharger 48, the pressure drop between the bearing arrangement and the compressor 52 is reduced, thus minimising the possibility of oil leakage from the bearing arrangement into the compressor 52 of the turbocharger 48.

It is conceivable that the pre-compressor 84, when energised, may increase the pressure of the air within the compressor 52 of the turbocharger 48 to such an extent that the pressure of the air within the compressor 52 is greater than the pressure within the bearing housing. In this situation, the possibility of oil leaking from the bearing housing into the compressor 52 is reduced even further.

The pre-compressor 84 shown in the embodiment of the invention shown in FIG. 3 may also be used during an engine braking operating mode of the generator arrangement to increase the amount of air (also known as the air mass flow) provided to the engine. During an engine braking operating mode of the generator arrangement, the provision of more air to the engine (and hence to the engine outlet) will increase the amount of back pressure applied to the engine and therefore may improve engine braking performance.

A further possible advantage of using a pre-compressor 84 is that the pre-compressor may be energised when required so as to increase the responsiveness of the turbocharger 48, for example to reduce the turbolag of the turbocharger 48.

It will be appreciated that although the pre-compressor shown in FIG. 3 is located upstream of the compressor 52 of the turbocharger 48, if the pre-compressor is to be used to either increase back pressure on the engine during an engine braking operating mode of the generator arrangement, or to improve the responsiveness of the turbocharger, then the pre-compressor may be located downstream of the turbocharger and upstream of the engine inlet.

The embodiment of the present invention shown in FIG. 3 also differs from the embodiment shown in FIG. 2 in that the flow control mechanism of the turbine 54 of the turbocharger 48 shown in FIG. 3 is a valve 96, for example a shut-off valve (as compared to a variable geometry mechanism as in the embodiment shown in FIG. 2). The valve 96 may be actuated such that it is moveable between a fully closed position, in which essentially no exhaust gas can pass through it, and a fully open position, in which the valve 96 may provide substantially no resistance to the passage of exhaust gas through it. The valve 96 may be actuated such that it is placed in a state intermediate the fully open position and the fully closed position such that the valve 96 partially inhibits the flow of exhaust gas through it. The valve 96 may be actuated such that it is possible to choose a particular intermediate state of the valve so that the valve inhibits the flow of exhaust gas through it to a desired degree. In some embodiments, the valve 96 may only move between an intermediate position and a fully open position or a fully closed position.

It will be appreciated that, although only the use of variable geometry mechanisms and valves have been described in the role of flow control mechanisms, any appropriate flow control mechanism may be used, for example a wastegate valve intermediate a turbine inlet and the engine outlet. However, in some embodiments the use of variable geometry mechanisms may be advantageous because it allows a large degree of control over the amount of gas passing through and also the speed of the exhaust gas which reaches the turbine of which the variable geometry mechanism forms a part.

If a wastegate mechanism were to be used as flow control mechanism which forms part of the present invention, it will be appreciated that wastegate mechanisms operate in a different manner to the variable geometry mechanisms and valves which have previously been discussed. For example, if it is desired to reduce the amount of exhaust gas which passes from the exhaust outlet to one of the turbines, in the case of a variable geometry mechanism (or valve), the variable geometry mechanism (or valve) may be closed, thereby reducing the size of the turbine inlet. However, in the case of a wastegate valve, if it is desired to reduce the amount of exhaust gas which passes from the exhaust outlet to one of the turbines the wastegate valve may be opened so as to allow more exhaust gas to bypass the turbine (i.e. pass from the engine outlet to the outlet of the generator arrangement without passing through the turbine). In some cases, any of opening a wastegate, closing a valve or closing a variable geometry mechanism may be referred to as closing the flow control mechanism because they all result in less exhaust gas flowing through the turbine with which the flow control mechanism is associated.

If it is desired to increase the amount of exhaust gas which passes from the exhaust outlet to one of the turbines, in the case of a variable geometry mechanism (or valve), the variable geometry mechanism (or valve) may be opened, thereby increasing the size of the turbine inlet. However, in the case of a wastegate valve, if it is desired to increase the amount of exhaust gas which passes from the exhaust outlet to one of the turbines the wastegate valve may be closed so as to allow less exhaust gas to bypass the turbine (i.e. pass from the engine outlet to the outlet of the generator arrangement without passing through the turbine). In some cases, any of closing a wastegate, opening a valve or opening a variable geometry mechanism may be referred to as opening the flow control mechanism because they all result in more exhaust gas flowing through the turbine with which the flow control mechanism is associated.

Some embodiments of the invention may have a turbocharger having a turbine (and hence a turbine wheel) which is substantially the same size (e.g. diameter) as that of the compressor (and hence the compressor wheel). However, the embodiments of the invention shown in FIGS. 2 and 3 both have a turbocharger 48 having a turbine 54 with a turbine wheel (not shown) that is smaller in diameter than that of the compressor wheel (also not shown) of the compressor of the respective turbocharger. The benefits of providing a smaller diameter turbine wheel (i.e. that the wheel is cheaper to manufacture and also is capable of spinning at greater rotational speeds for a given mass flow and speed of gas flowing into the turbine) have already been discussed.

It is common for turbochargers to have a compressor wheel and a turbine wheel of similar diameter. This is because, in general, when the compressor wheel and turbine wheel of a turbocharger are of a similar diameter, the efficiency of the turbocharger is maximised. It follows that in some embodiments of the present invention, wherein the turbocharger turbine and hence turbine wheel is smaller than usual (for example, smaller in diameter than the compressor wheel), the turbocharger efficiency may be adversely affected.

One way of mitigating the effects of having a smaller than usual turbine may be to provide a pre-compressor to the generator arrangement. The use of a pre-compressor within the generator arrangement is discussed above in relation to the embodiment of the invention shown in FIG. 3.

Figure 4:
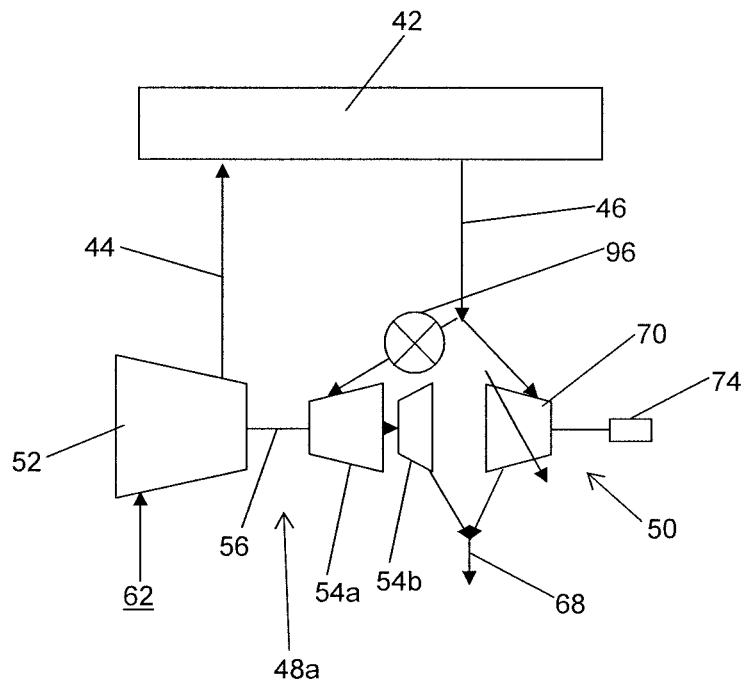
FIG. 4 is a schematic diagram showing the layout of a third generator arrangement which may be operated as part of a method according to the present invention.

A further possible way of mitigating the reduction in turbocharger efficiency due to the use of a reduced diameter turbine wheel is shown in the embodiment of the present invention shown in FIG. 4. The turbocharger 48a shown in FIG. 4 differs from that shown in the previous embodiments in that it has a turbine arrangement having a first turbine 54a and a second turbine 54b. The first and second turbines 54a, 54b each have a turbine wheel (not shown) each of which is mounted to the turbocharger shaft 56. In the embodiment shown, an inlet to the first turbine 54a is in fluid flow communication with the exhaust outlet 46 of the engine via the valve 96. An inlet (not shown) of the second turbine 54b is in fluid flow communication with an outlet (not shown) of the first turbine 54a. An outlet (not shown) of the second turbine 54b is in fluid flow communication with the arrangement outlet 68. Exhaust gas flows through the turbines 54a, 54b of the turbocharger 48a as follows. Exhaust gas flows from the engine 42, via the engine outlet 46 and valve 96, to the first turbine 54a; downstream to the second turbine 54b; and then to the arrangement outlet 68.

In one embodiment of the present invention, in the case where the turbocharger has two turbines, the first and the second turbines 54a, 54b may be arranged such that the flow of the exhaust gas into the first turbine is substantially perpendicular to the axis about which the turbocharger shaft 56 rotates. The outlet of the first turbine 54a and the inlet of the second turbine 54b may both be substantially parallel to the axis of rotation of the turbocharger shaft 56. The outlet of the second turbine 54b may be such that gas flowing through the outlet flows in a direction substantially perpendicular to the axis of rotation of the turbocharger shaft 56. In such an arrangement, the first turbine may be referred to as a radial inflow turbine and the second turbine may be referred to as an axial inflow turbine.

A turbine arrangement having a first radial inflow turbine and a second axial inflow turbine in series with one another may be referred to as a radial-inflow axial-inflow turbine arrangement.

In some embodiments of the present invention which include an axial inflow turbine and a radial inflow turbine, the axial inflow and radial inflow turbines may be formed (for example cast) in an integral manner.

Within the embodiment shown in FIG. 4, it will be appreciated that the valve 96 controls the flow of exhaust gas from the engine outlet 46 into the first turbine 54a. It will be appreciated that in place of a valve as shown, a variable geometry mechanism, wastegate or any other appropriate flow control device may be used.

Other possible modifications and applications of the invention will be readily apparent to the appropriately skilled person.

The invention claimed is:

1. A turbo-compound engine comprising:
a turbocharger having a compressor configured to be placed in fluid flow communication with an engine inlet, and a first turbine configured to be placed in fluid flow communication with a first engine outlet,
an electrical generator having a second turbine configured to be placed in fluid flow communication with the first engine outlet or a second engine outlet,
the first and second turbines being parallel to one another,
a first flow control mechanism configured to control the flow of fluid from the first engine outlet to the first turbine,
a second flow control mechanism configured i) if the second turbine is placed in fluid communication with the first engine outlet to control the flow of fluid from the first engine outlet to the second turbine; or ii) if the second turbine is placed in fluid flow communication with the second engine outlet, to control the flow of fluid from the second engine outlet to the second turbine; and
a controller configured to select an operating mode as a function of at least one of: a speed of an engine, a temperature of at least a portion of the engine, a property of an exhaust fluid of the engine, and whether an engine braking command is received by the controller, the controller being configured to control the first and second fluid control mechanisms as a function of the selected operating mode,
wherein the controller is configured such that when the engine operates at an idling speed and when at least a portion of the engine is at a temperature which is less than a normal operating temperature of the portion of the engine, said selecting of an operating mode comprises selecting a cold idle operating mode;
wherein in the cold idle operating mode, said controller is configured to control the first flow control mechanism to close the first flow control mechanism to prevent the exhaust fluid passing through and bypassing the first turbine; and
wherein in the cold idle operating mode, said controller is configured to control the second flow control mechanism to partially or fully open the second flow control mechanism such that fluid flows through the second turbine.

2. A turbo-compound engine according to claim 1, wherein the first engine outlet and the second engine outlet are one and the same.

3. A turbo-compound engine according to claim 1, wherein the first flow control mechanism comprises one of a variable geometry turbine mechanism, a valve and a wastegate valve.

4. A turbo-compound engine according to claim 1, wherein the second flow control mechanism comprises one of a variable geometry turbine mechanism, a valve and a wastegate valve.

5. A turbo-compound engine comprising:
a turbocharger having a compressor configured to be placed in fluid flow communication with an engine inlet, and a first turbine configured to be placed in fluid flow communication with a first engine outlet,
an electrical generator having a second turbine configured to be placed in fluid flow communication with the first engine outlet or a second engine outlet,
the first and second turbines being parallel to one another,
a first flow control mechanism configured to control the flow of fluid from the first engine outlet to the first turbine,
a second flow control mechanism configured i) if the second turbine is placed in fluid flow communication with the first engine outlet, to control the flow of fluid from the first engine outlet to the second turbine; or ii) if the second turbine is placed in fluid flow communication with the second engine outlet, to control the flow of fluid from the second engine outlet to the second turbine; and
a controller configured to select an operating mode as a function of at least one of: a speed of an engine, a temperature of at least a portion of the engine, a property of an exhaust fluid of the engine, and an engine braking command received by the controller, the controller being configured to control the first and second fluid control mechanisms as a function of the selected operating mode,
wherein the controller is configured such that when the engine operates at idling speed and when at least a portion of the engine is at a temperature which is a normal operating temperature of the portion of the engine, said selecting of an operating mode comprises selecting an idling operating mode;
wherein in the idling operating mode, said controller is configured to control the first flow control mechanism to fully open the first flow control mechanism such that fluid passes can pass through the first turbine or bypass the first turbine; and
wherein in the idling operating mode, said controller is configured to control the second flow control mechanism to fully open the second flow control mechanism such that fluid passes through the second turbine-or bypass the second turbine.

6. A turbo-compound engine according to claim 5, wherein the first engine outlet and the second engine outlet are one and the same.

7. A turbo-compound engine according to claim 5, wherein the first flow control mechanism comprises one of a variable geometry turbine mechanism, a valve and a wastegate valve.

8. A turbo-compound engine according to claim 5, wherein the second flow control mechanism comprises one of a variable geometry turbine mechanism, a valve and a wastegate valve.

9. A turbo-compound engine comprising;
a turbocharger having a compressor configured to be placed in fluid flow communication with an engine inlet, and a first turbine configured to be placed in fluid flow communication with a first engine outlet,
an electrical generator having a second turbine configured to be placed in fluid flow communication with the first engine outlet or a second engine outlet,
the first and second turbines being parallel to one another,
a first flow control mechanism configured to control the flow of fluid from the first engine outlet to the first turbine,
a second flow control mechanism configured i) if the second turbine is placed in fluid flow communication with the first engine outlet, to control the flow of fluid from the first engine outlet to the second turbine; or ii) if the second turbine is placed in fluid flow communication with the second engine outlet, to control the flow of fluid from the second engine outlet to the second turbine; and
a controller configured to select an operating mode as a function of at least one of: a speed of an engine, a temperature of at least a portion of the engine, a property of an exhaust fluid of the engine, and an engine braking command received by the controller, the controller being configured to control the first and second fluid control mechanisms as a function of the selected operating mode;
wherein said controller is configured such that when the engine operating speed is increasing, said selecting of an operating mode comprises selecting an accelerating operating mode;
wherein in the accelerating operating mode, said controller is configured to control the first flow control mechanism to fully open the first flow control mechanism such that fluid passes through the first turbine; and
wherein in the accelerating operating mode, said controller is configured to control the second flow control mechanism to fully close the second flow control mechanism to prevent the exhaust fluid passing through and bypassing the second turbine.

10. A turbo-compound engine according to claim 9, wherein the first engine outlet and the second engine outlet are one and the same.

11. A turbo-compound engine according to claim 9, wherein the first flow control mechanism comprises one of a variable geometry turbine mechanism, a valve and a wastegate valve.

12. A turbo-compound engine according to claim 9, wherein the second flow control mechanism comprises one of a variable geometry turbine mechanism, a valve and a wastegate valve.

13. A turbo-compound engine comprising:
a turbocharger having a compressor configured to be placed in fluid flow communication with an engine inlet, and a first turbine configured to be placed in fluid flow communication with a first engine outlet,
an electrical generator having a second turbine configured to be placed in fluid flow communication with the first engine outlet or a second engine outlet, the first and second turbines being parallel to one another,
a first flow control mechanism configured to control the flow of fluid from the first engine outlet to the first turbine,
a second flow control mechanism configured i) if the second turbine is placed in fluid flow communication with the first engine outlet, to control the flow of fluid from the first engine outlet to the second turbine; or ii) if the second turbine is placed in fluid flow communication with the second engine outlet, to control the flow of fluid from the second engine outlet to the second turbine; and
a controller configured to select an operating mode as a function of at least one of: a speed of an engine, a temperature of at least a portion of the engine, a property of an exhaust fluid of the engine, and an engine braking command received by the controller, the controller being configured to control the first and second fluid control mechanisms as a function of the selected operating mode;
wherein the controller is configured such that when the engine operating speed is a constant speed and is greater than the idling speed of the engine, said selecting of an operating mode comprises selecting a steady state operating mode; and
wherein in the steady state operating mode, said controller is configured to control the second flow control mechanism to at least partially open the second flow control mechanism thereby opening a bypass path around the first turbine via the second turbine, such that gas flowing through the bypass path passes through from the first engine outlet to an arrangement outlet via the second turbine and without passing through the first turbine.

14. A turbo-compound engine according to claim 13, wherein the first engine outlet and the second engine outlet are one and the same.

15. A turbo-compound engine according to claim 13, wherein the first flow control mechanism comprises one of a variable geometry turbine mechanism, a valve and a wastegate valve.

16. A turbo-compound engine according to claim 13, wherein the second flow control mechanism comprises one of a variable geometry turbine mechanism, a valve and a wastegate valve.

17. A turbo-compound engine comprising:
a turbocharger having a compressor configured to be placed in fluid flow communication with an engine inlet, and a first turbine configured to be placed in fluid flow communication with a first engine outlet,
an electrical generator having a second turbine configured to be placed in fluid flow communication with the first engine outlet or a second engine outlet, the first and second turbines being parallel to one another,
a first flow control mechanism configured to control the flow of fluid from the first engine outlet to the first turbine,
a second flow control mechanism configured i) if the second turbine is placed in fluid flow communication with the first engine outlet, to control the flow of fluid from the first engine outlet to the second turbine; or ii) if the second turbine is placed in fluid flow communication with the second engine outlet, to control the flow of fluid from the second engine outlet to the second turbine; and a controller configured to select an operating mode as a function of at least one of: a speed of an engine, a temperature of at least a portion of the engine, a property of an exhaust fluid of the engine, and an engine braking command received by the controller, the controller being configured to control the first and second fluid control mechanisms as a function of the selected operating mode;

wherein the controller is configured such that when an engine braking command signal is received by the controller, said selecting of an operating mode comprises selecting an engine braking operating mode; and wherein in the engine braking operating mode, said controller is configured to control the first flow control mechanism to at least partially close the first flow control mechanism so as to reduce the flow of exhaust gas through the first turbine and thereby increase the pressure of fluid in the first engine outlet, and hence increase the back pressure of the fluid on the engine.

18. A turbo-compound engine according to claim 17, wherein the first engine outlet and the second engine outlet are one and the same.

19. A turbo-compound engine according to claim 17, wherein the first flow control mechanism comprises one of a variable geometry turbine mechanism, a valve and a wastegate valve.

20. A turbo-compound engine according to claim 17, wherein the second flow control mechanism comprises one of a variable geometry turbine mechanism, a valve and a wastegate valve.

* * * * *